United States Patent
Sculler et al.

(10) Patent No.: US 9,344,667 B2
(45) Date of Patent: May 17, 2016

(54) RECONFIGURABLE VIDEO AND PERIPHERAL MOUNTING SYSTEM

(71) Applicant: Bell'O International Corp., Morganville, NJ (US)

(72) Inventors: Steven J. Sculler, Morganville, NJ (US); Steven R. Remy, New York, NY (US)

(73) Assignee: Bell'O International Corp., Delray Beach, FL (US), `

(*) Notice: Subject to any disclaimer, the term of this patent is extended or adjusted under 35 U.S.C. 154(b) by 135 days.

(21) Appl. No.: 14/198,831

(22) Filed: Mar. 6, 2014

(65) Prior Publication Data

US 2014/0270910 A1    Sep. 18, 2014

Related U.S. Application Data

(60) Provisional application No. 61/779,461, filed on Mar. 13, 2013.

(51) Int. Cl.
| | |
|---|---|
| *F16M 11/00* | (2006.01) |
| *F16M 11/04* | (2006.01) |
| *H04N 5/64* | (2006.01) |
| *F16M 11/24* | (2006.01) |
| *F16M 11/10* | (2006.01) |
| *F16B 7/10* | (2006.01) |

(52) U.S. Cl.
CPC . *H04N 5/64* (2013.01); *F16B 7/105* (2013.01); *F16M 11/04* (2013.01); *F16M 11/10* (2013.01); *F16M 11/24* (2013.01); *H04N 5/642* (2013.01); *Y10T 403/32467* (2015.01); *Y10T 403/75* (2015.01)

(58) Field of Classification Search
CPC ....... F16M 11/00; F16M 11/04; F16M 11/10; F16M 11/045; A47G 1/164; F16B 7/10; H04N 5/64

USPC ............ 248/124.1, 125.7, 207, 287.1, 298.1, 248/220.21, 176.1, 397, 917; 211/90.02
See application file for complete search history.

(56) References Cited

U.S. PATENT DOCUMENTS

| | | | | |
|---|---|---|---|---|
| 6,089,387 A | * | 7/2000 | Varfolomeeva | A47B 57/06 211/106 |
| D583,780 S | * | 12/2008 | Rein | D14/125 |
| D631,875 S | * | 2/2011 | Skull | D14/239 |
| 7,963,489 B2 | * | 6/2011 | O'Keene | F16M 11/10 211/99 |
| 8,276,864 B2 | * | 10/2012 | Ye | F16M 11/04 248/287.1 |

(Continued)

OTHER PUBLICATIONS

JAK90, Leaflet No. 463683, Dec. 2012.

*Primary Examiner* — Tan Le
(74) *Attorney, Agent, or Firm* — Lerner, David, Littenberg, Krumholz & Mentlik, LLP

(57) ABSTRACT

A mounting system includes an interior arm having first apertures, first and second faces, to which the first apertures are open, and first and second side walls between the faces. An exterior arm may define a channel to receive a portion of the interior arm. The exterior arm further includes a second aperture configured to align with one of the first apertures when the interior arm is received within the channel. A first fixation element extends through one of the first apertures and engages with a first external component. A second fixation element extends through the second aperture of the exterior arm and through another of the first apertures so as to maintain a position of the exterior arm. The exterior arm includes mounting means at a first end thereof and configured to attach with a second external component.

18 Claims, 12 Drawing Sheets

(56) References Cited

U.S. PATENT DOCUMENTS

| | | |
|---|---|---|
| 8,418,861 B1 | 4/2013 | Weaver et al. |
| 2006/0208145 A1* | 9/2006 | Chen .................... F16M 11/00 248/289.11 |
| 2011/0073738 A1* | 3/2011 | Takao .................... F16M 11/00 248/397 |
| 2014/0270910 A1* | 9/2014 | Sculler .................... H04N 5/64 403/109.1 |

* cited by examiner

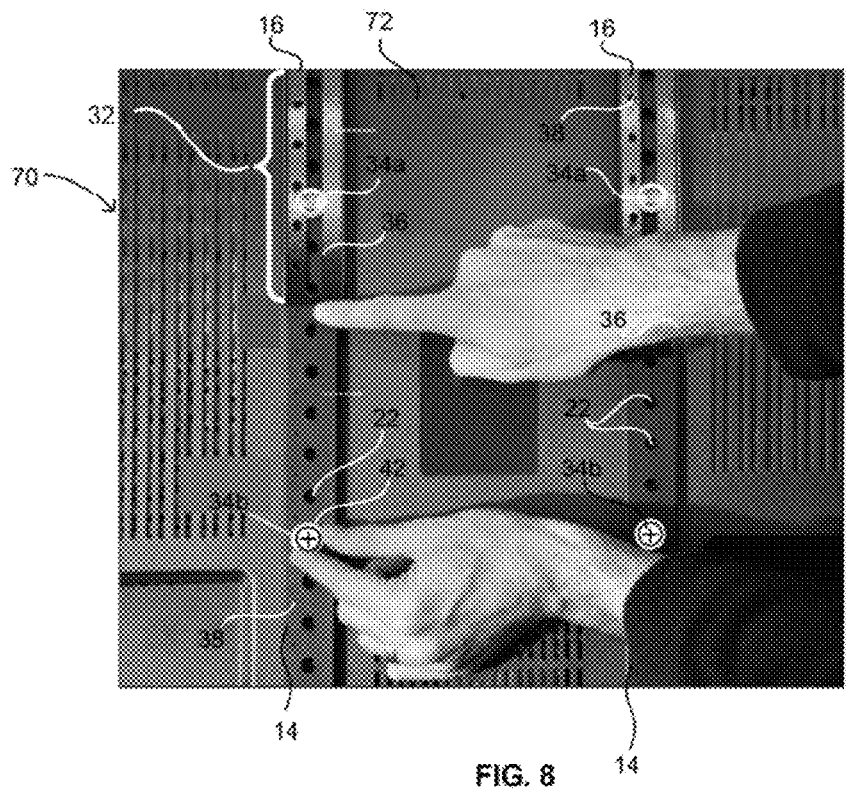
FIG. 8
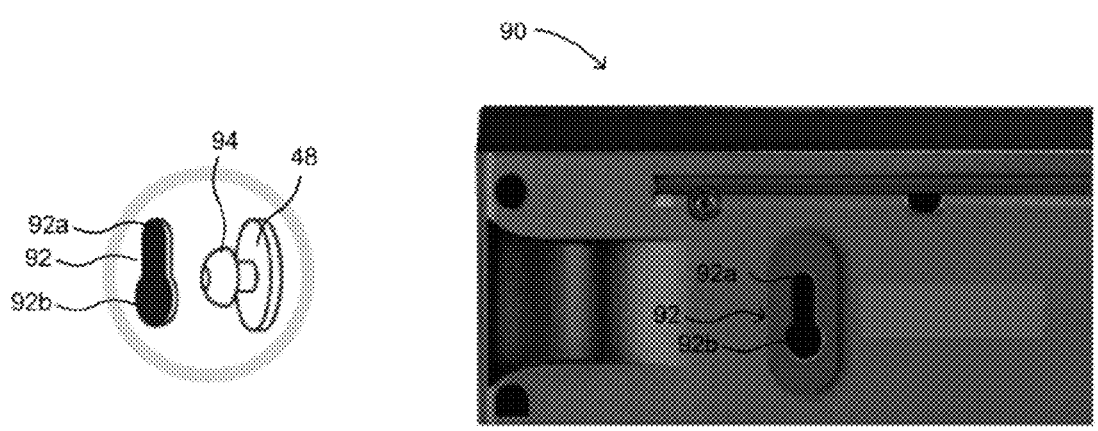
FIG. 9A
FIG. 9B

RECONFIGURABLE VIDEO AND PERIPHERAL MOUNTING SYSTEM

CROSS REFERENCE TO RELATED APPLICATIONS

The present application claims the benefit of the filing date of U.S. Provisional Patent Application No. 61/779,461 filed Mar. 13, 2013, the disclosure of which is hereby incorporated herein by reference.

BACKGROUND

Various forms of home theatre arrangements have become increasingly popular in recent years. Often, such systems include a combination of video and audio components configured to work together to provide an audio/video arrangement that is often better than that provided by a television alone. Video displays in such arrangements can include various flat-panel or flatscreen television or the like, including LCD type displays, plasma type displays or other similar types of televisions. Video displays can also be a computer monitor that similarly incorporates a flat panel arrangement using an LCD screen or the like.

Audio components utilized with home theatre systems can be in the form of a speaker connected with either the video display itself, one or more content devices (such as a cable or satellite receiver box, a DVD or Blu-Ray player, a computer-based media center or the like) or an audio/video receiver. In another example, an audio component can be a fully-contained, all-in-one audio source of the type commonly referred to as a "sound bar" or the like. These types of audio components typically have integrated switching, decoding and amplification components so as to receive various types of audio signals (such as various standards of surround sound signals including for example Dolby® 5.1 and 7.1 channel). A sound bar can be configured to amplify the decoded sound and present that sound via one or more speakers included therein. They can further be configured to simulate a surround sound environment using only its integrated speakers according to a program included therein that utilizes surround sound information from the decoded audio signal. Sound bars can also include switching circuitry so that multiple sound sources can be connected therewith for selective audio presentation thereby. Other audio components can also be in the form of center-channel speakers or the like or one or more standard speakers. These types of audio components, including the aforementioned center channel surround speakers and sound bars, are typically associated, or used extensively, with video displays. Often, however, these types of components are configured to rest on a surface, such as a shelf or component cabinet or the like, or to mount to a wall, but not specifically to mount to a television.

Flat-panel type video displays typically include various structures or elements thereon for attachment of the display with various external components. For example, video displays often include structures to removably attach a stand thereto so that the television can stably rest on a surface. Further, video displays can include specific mounting features to attach with a specific type of audio component. In most cases, however, such mounts are only configured to work with specific audio components made by that brand within a specific time period. This makes mounting with earlier or later released audio components made by different manufacturers difficult or unworkable, except in the instances mentioned above where a video display such as a television is configured to work specifically with a preselected audio component. Because, however, audio components are typically configured to mount to a wall, they often include various mounting structures or points of attachment that are included to be used in mounting the components to a wall. Because of the flexible nature of wall mounting, these mounting structures often differ among manufacturers, both in the type of fixation element with which they can attach as well as the spacing between such structures (as multiple points of attachment are often necessary).

Although neither audio components nor video displays are often configured to attach together, or such that audio components can mount to video displays, there are instances where attaching or mounting an audio component to a video display would be desirable. In an example, flat-panel television stands have been developed that include a vertical post on which the television can be mounted. A speaker cannot be mounted on a wall behind such a post, because it would be blocked by the post. In another example, when a video display is itself mounted to an articulating or rotating stand or display wall-mount, having the audio component attached with the video display (and optionally additional components such as a cable box, DVD or Blu-Ray® players, multi media players, and the like) would allow the audio component to move with the video display. Similar advantages of the above examples can also be realized when mounting a display from the ceiling or from a simple post or pole. Further, some may simply prefer to have a sound bar mounted over a video display instead of having to arrange for additional shelf space on which to rest a sound bar, which could be accomplished if measures are taken to prevent instability or tipping due to the extra weight of the sound bar, etc., which can include securing the television to the surface on which it rests such as by the television base or by other means.

SUMMARY

An aspect of the present disclosure can relate to a mounting system for attachment between a first external component and a second external component. The mounting system can include a first interior arm extending along a longitudinal axis and having a plurality of first apertures therethrough at spaced apart intervals and being aligned with one another in a single row along the longitudinal axis. The interior arm has first and second spaced apart and substantially parallel faces, to which the first apertures are open, and first and second side walls extending between the faces. An exterior arm extends along a longitudinal axis and is configured to be coupled with the interior arm. The exterior arm further includes at least one second aperture. The second aperture is configured to align with at least one of the first apertures of the interior arm when the interior arm is arranged for coupling with the exterior arm. The exterior arm includes a first mounting means disposed toward a first end thereof that is configured to facilitate attachment between the exterior arm and the second external component. The system further includes first and second fixation elements, the first fixation element being configured to extend through one of the first apertures in the interior arm and engage with the first external component. The second fixation element is configured to extend through the second aperture of the exterior arm and through another of the first apertures in the interior arm when the interior arm is arranged for coupling with the exterior arm so as to at least partially maintain a position of the exterior arm relative to the first external component.

In one embodiment, the mounting system may include a locking element at the another of the first apertures of the interior arm for engaging with the second fixation element.

In one embodiment, the second fixation element may be configured to extend through the second aperture of the exterior arm and through the another of the first apertures in the interior arm and to attach with the first external component when the interior arm is arranged for coupling with the exterior arm.

In one embodiment, the exterior arm may define a channel configured to receive at least a portion of the interior arm therein with portions of the channel contacting the side walls and the first face of the interior arm, and the second fixation element may be configured to attach with the first external component with the interior arm received within the channel of the exterior arm.

In an example the second aperture can include an elongated slot extending in the direction of the longitudinal axis of the exterior arm. The slot can be configured to align with a plurality of the first apertures of the interior arm when the interior arm is received within the channel. In such an arrangement, the interior arm can be slidably affixed within the channel of the exterior arm. In such a configuration, the exterior arm can include a plurality of elongated slots, each extending in the direction of the longitudinal axis thereof. The slots can be aligned within one another along the longitudinal axis of the exterior arm.

The interior arm can include a plurality of first retention assistance members, and the exterior arm can include a plurality of second retention assistance members. The first and second retention assistance members can be spaced apart relative to one another at regular intervals in directions along the respective longitudinal axes of the interior arm and the exterior arm such that at least some of the first retention assistance members align with at least some of the second retention assistance members when the interior arm is coupled with the exterior arm in a plurality of fixed intervals along the longitudinal axes.

In a further example, the first retention assistance members can be generally convex projections that extend from the first face of the interior arm, and the second retention assistance members can be apertures open to the channel of the exterior arm. The first and second retention assistance members can be configured to maintain a position of the exterior arm relative to the second exterior arm when at least the second fixation element is received through the slot and one of the apertures and engaged with the first external component. In an example, the position maintained of the exterior arm relative to the second exterior can be at a force applied along the longitudinal axis of the exterior arm below a first threshold amount and can be achieved when the fixation element is engaged with the first external component a first distance. In another example, the position maintained of the exterior arm relative to the interior arm is at a force applied along the longitudinal axis of the exterior arm above the first threshold amount and is achieved when the fixation element is engaged with the first external component a second distance that is greater than the first distance. In an additional or alternative arrangement, the mounting system can include secondary locking means engagable between the exterior arm and the interior arm to help maintain a position of the exterior arm along the longitudinal axis of the interior arm when the interior arm is coupled with the exterior arm.

The first external element can define a face extending in first and second lateral directions to edges surrounding the face. In such an example, and the first and second fixation elements can be configured to engage with threaded apertures positioned at predetermined intervals along the face remote from the edges such that the interior arm extends along the face. Further, the first mounting means can be positionable laterally beyond one of the edges from the face by adjustment of the exterior arm relative to the longitudinal axis of the interior arm such that the second external component does not overlie the face when affixed with the mounting system. In an example of such a configuration, the first external element can be a video display, and the face can be positioned along the rear of the display opposite a display screen. In such an example, first apertures of the first interior arm can be configured such that at least two of the first apertures align with respective mounting holes on the face of the display. The mounting holes of the display can be configured in a predetermined array according to a predetermined mounting standard.

Another aspect of the present disclosure relates to a mounting system for attachment between a first external component and a second external component. The system includes a first extension arm configured to attach with the first external component at a first lateral position therealong. The first extension arm has a first attachment element on an end thereof. A second extension arm is configured to attach with the first external component at a second lateral position therealong that is spaced apart from the first lateral position at a first distance. The second extension arm has a second attachment element on an end thereof. The system can further include a bridge member having a lateral axis and a longitudinal axis, the bridge member including first and second attachment apertures. The bridge member is affixable to the first extension arm by receiving the first attachment element in the first attachment aperture and to the second extension arm by receiving the second attachment element in the second attachment aperture. The bridge member further including a mounting aperture configured for attachment with the second external component.

In an example, the first and second attachment apertures can be first and second ones of a plurality of first slots evenly spaced apart from one another at a first interval in the direction of the lateral axis, each of the first slots extending parallel to the lateral axis of the bridge member. The bridge member can then affixable to the first extension arm by receiving the first attachment element in the first one of the first slots and to the second extension arm by receiving the second attachment element in the second one of the first slots. The first and second ones of the first slots can be selected to be spaced apart from each other at a distance that corresponds to the lateral distance between the first and second extension arms. Each of the first slots can be elongated in a direction parallel to the longitudinal axis of the bridge member, and the first and second attachment elements can be slidable within their respective first slots in the direction of the longitudinal axis of the bridge member. Alternatively, each of the first slots can be elongated in a direction parallel to the lateral axis of the bridge member, and the first and second attachment elements can be slidable within their respective first slots in the direction of the lateral axis of the bridge member. The mounting aperture of the bridge member can be a second slot extending in the direction of the lateral axis. Further, the mounting aperture of the bridge member can be a plurality second slots being elongated in the direction of the lateral axis of the bridge member so as to define axes that are substantially aligned with one another.

The mounting system can further include an adaptor plate and a plurality of adaptors. The adaptors can each have a distinct mounting configuration such that one of the adaptors is selectable to match a mounting configuration of the second external component. The adaptor plate can be configured to attach the selected one of the adaptors to the bridge member for attachment of the second external component thereto. The second external component can be a sound bar having a mounting element thereon, and the mounting configuration of the selected one of the adaptors can be configured to attach with the mounting element of the sound bar.

The mounting system can further include a side arm affixable with the bridge member so as to extend outwardly therefrom in the direction of the lateral axis thereof with the mounting aperture being positionable on the side arm.

The first extension arm and the second extension arm can each include an interior arm extending along a longitudinal axis and having a plurality of first apertures therethrough at spaced apart intervals. The extension arms can further each include an exterior arm extending along a longitudinal axis and defining a channel configured to receive at least a portion of the interior arm therein. The exterior arm can include a second aperture therein that can be in the form of elongated slot extending in the direction of the longitudinal axis thereof. The second aperture can be configured to align with one or more of the first apertures of the interior arm when the interior arm is received within the channel. The first and second extension arms can further include first and second fixation elements. The first fixation element can be configured to extend through one of the first apertures in the interior arm and engage with the first external component. The second fixation element can be configured to extend through the second aperture of the exterior arm and through one of the first apertures in the interior arm and to attach with the first external component with the interior arm received within the channel of the exterior arm so as to at least partially maintain a position of the exterior arm relative to the first external component.

Another aspect of the present disclosure can relate to a method for affixing an audio component to a video display. The method includes locating mounting holes on a back face of the video display and positioning a first guide arm and a second guide arm along the back face of the video display such that two of a plurality of apertures through each of the first guide arm and the second guide arm align with respective mounting holes of the display. The method further includes assembling a first extension arm and a second extension arm with the first guide arm and the second guide arm, respectively, such that the first guide arm and second guide arm are respectively coupled with the first extension arm and the second extension arm, and in one embodiment the first guide arm and second guide arm may be received within respective channels of the first extension arm and the second extension arm. The extension arms and the guide arms are then secured to the display with four fixation elements. One fixation element is inserted through each of the two aligned apertures of the first and second guide arms and affixed with the respective mounting holes. At least two of the fixation elements further pass through respective apertures in the first and second extension arms. The method also includes affixing a bridge member to the first extension arm and the second extension arm by assembling a first aperture in the bridge member with an attachment element of the first extension arm and assembling a second aperture in the bridge member with an attachment element of the second extension arm, and affixing the audio component to the bridge member.

The step of affixing the audio component to the bridge member can include attachment of a mounting element to the audio component and to a third aperture in the bridge member. The step of assembling a first extension arm and a second extension arm with the first guide arm and the second guide arm can include temporarily maintaining an aligned position of the first extension arm relative to the second extension arm using secondary securing means between the extension arms and the respective guide arms.

BRIEF DESCRIPTION OF THE DRAWINGS

FIG. 8 shows another alternative arrangement of the partial assembly of FIG. 5A.

FIGS. 9A and 9B show an example of a mounting structure that can be included in an example of an audio component.

DETAILED DESCRIPTION

Figure 1:
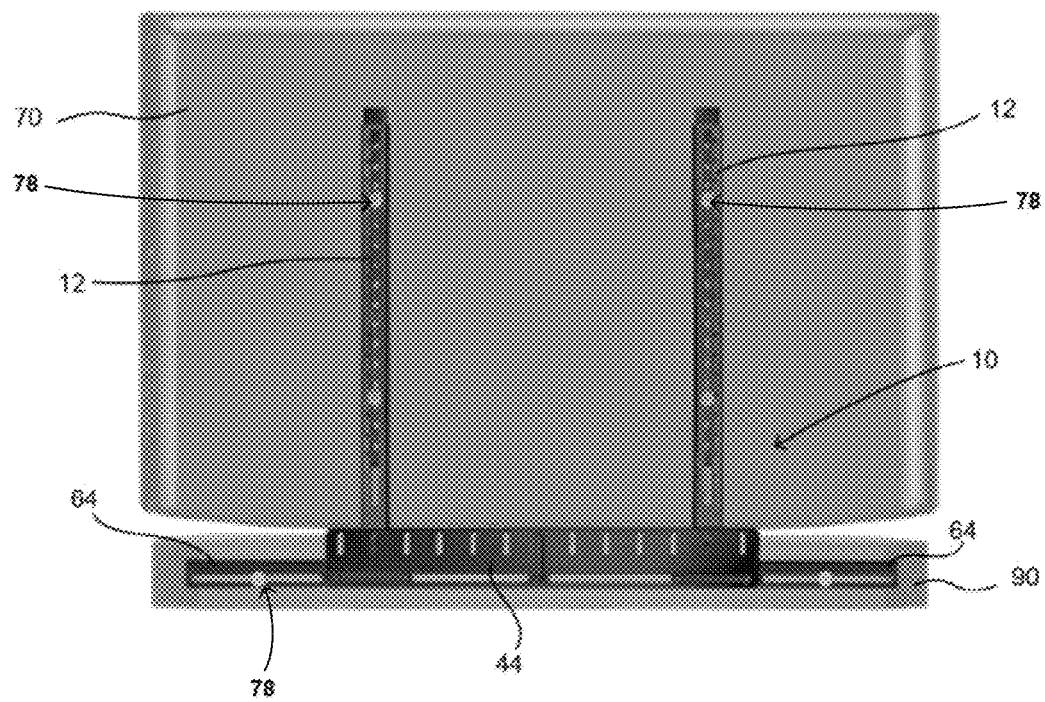
FIG. 1 shows an example of a mounting system according to an aspect of the disclosure attached between an example of a display and an example of an audio component.

Turning to the drawings, wherein similar reference numbers are used to represent similar features, unless otherwise indicated, FIG. 1 shows a mounting system 10 according to an aspect of the present disclosure that is used to mount an audio component 90 to a video display 70. The audio component 90 can include one or more audio sources, such as speakers or the like or a fully-contained audio component of the type sometimes referred to as a sound bar or the like.

Figure 2:
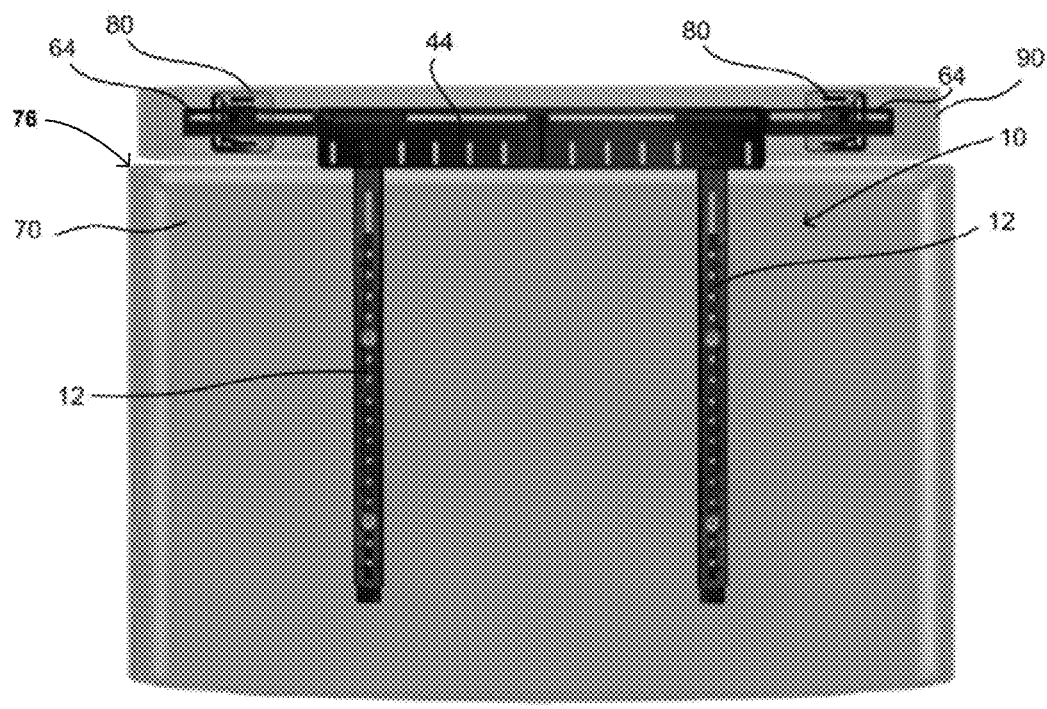
FIG. 2 shows an alternative configuration of the mounting system of FIG. 1.
Figure 3:
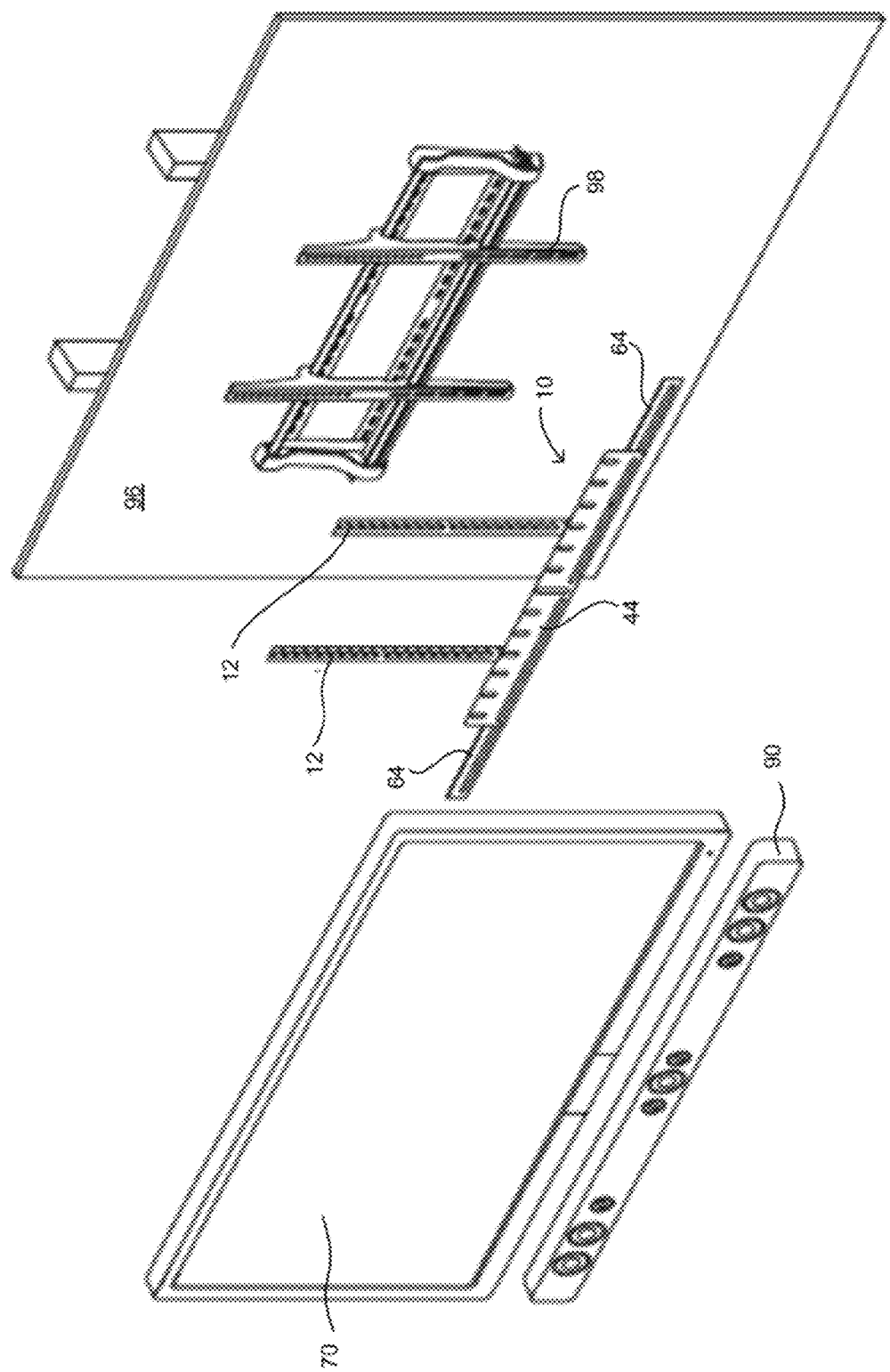
FIG. 3 shows an exploded view of the mounting system of FIG. 1 and an example of a video display, an audio component, and a display wall mount that can be assembled therewith.

As shown in FIG. 1, mounting system 10 can be attached on the back surface 72 of video display 70. The various components of mounting system 10 can be configured such that audio component 90 can attach to mounting system 10 such that it is mounted on the video display 70 beyond and adjacent to lower edge 74 thereof. In an alternative arrangement shown in FIG. 2, the components of mounting system 10 can be configured such that audio component 90 can attach to mounting system 10 such that it is mounted on the video display 70 adjacent to upper edge 76 thereof. The multiple configurations afforded by the construction of the mounting system 10 (described further herein) can be selected and implemented by the user, as desired depending on preference and the setting or use of video display 70 and audio component 90. As shown in FIG. 3, the assembly of the mounting assembly 10 with video display 70 and audio component 90 can be mounted to a wall 96 by a display mount 98.

Figure 4:
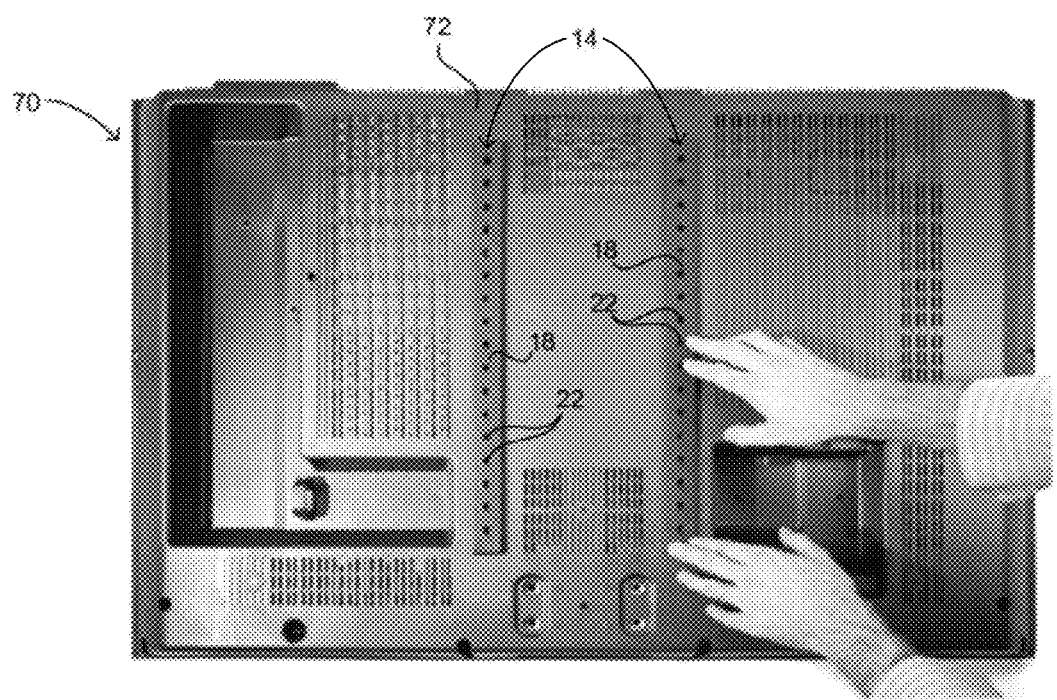
FIG. 4 shows components of the mounting system of FIG. 1 assembled with an example of a video display.
Figure 5A:
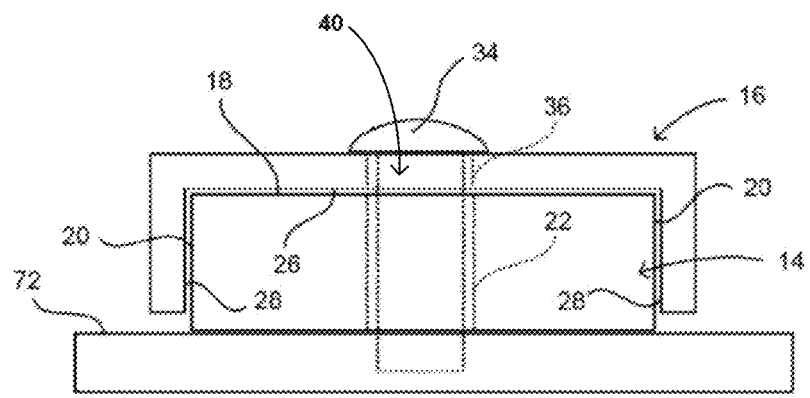
FIG. 5A shows one embodiment of components of the mounting system assembled together.
Figure 6:
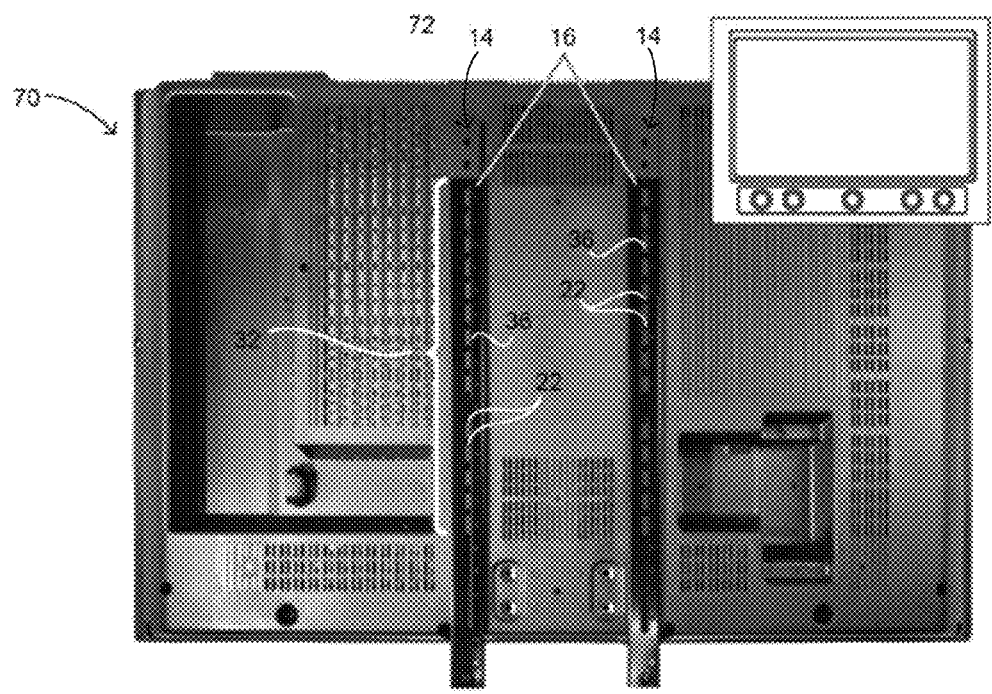
FIG. 6 shows another view of the mounting system components of FIG. 5A assembled with an example of a video display.

Mounting system 10 is configured to provide a pair of adjustable arms 12 that can be affixed to mounting holes 78 (shown in the example of FIG. 1). Referring to FIGS. 4, 5A and 6, the adjustable arm 12 can be made adjustable by configuring each with an inner guide arm 14 and an outer extension arm 16. In such an arrangement, guide arm 14 can be configured as a generally solid piece of material, such as plastic or the like, with a pair of spaced apart major faces 18 and a pair of corresponding sidewalls 20 that extend along the thickness of guide arms 14. Guide arms 14 can further include a plurality of holes 22 that are spaced along the guide arms 14 at regular intervals. In an example, the holes 22 can be spaced at intervals that correspond to one or more universal spacing schemes in which the display mounting holes 78 are spaced. For example, a number of video displays of the type shown in the example of FIG. 1, have mounting holes 78 that are arranged in a standardized mounting configuration that is utilized by various types of display mounts, such as monitor arms, display wall mounts, and the like. One such standardized configuration has been established by the Video Electronics Standards Association (VESA®) and is known as the "VESA-mount" configuration. There are, in fact, different configurations that vary with the size of display 70 and can specify that the mounting holes are either in a square 75 mm by 75 mm pattern, a square 100 mm by 100 mm pattern, or a vertical rectangular pattern measuring 100 mm by 200 mm. Accordingly, in one example guide arms 14 can be made compliant with both 100 mm by 100 mm and 100 mm by 200 mm configurations by spacing holes 22 at 20 mm intervals therealong. It is noted that several holes can be provided such that a number of different pairs thereof align with respective mounting holes 78 to allow the user of the mounting system 10 to maximize compliance with a particular display 70, including a proper overall length of adjustable arms 12 (as described further below), to provide adequate support and stability for extension arms 16 (as also described below), and to give the user options for positioning guide arms 14 to minimize interference with various features of the display 70 itself.

Figure 7:
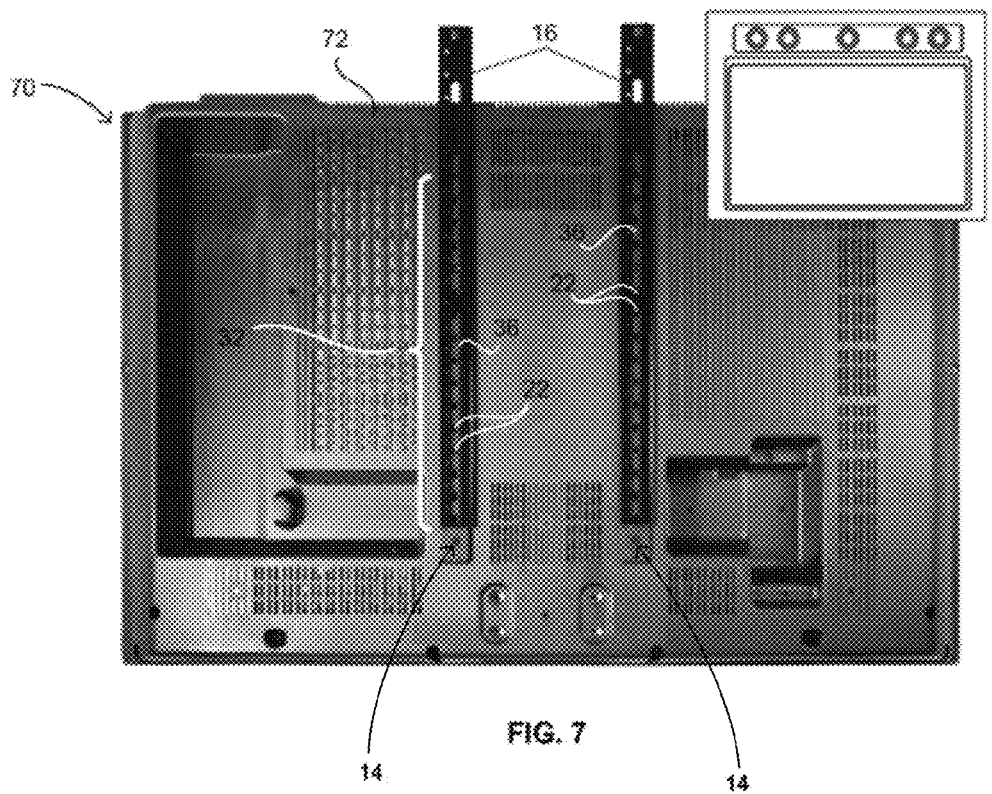
FIG. 7 shows an alternative arrangement of the partial assembly of FIG. 5A.

Extension arms 16 are configured to be positioned over guide arms. As such, extension arms 16 can be formed in a generally U-shaped configuration so as to form an inner channel 24 (FIG. 5A) that can receive a respective guide arm 14 therein with an interior face 26 contacting a face 18 of guide arm and with side faces 28 thereof contacting respective side faces 20 of guide arm 14. In this manner, extension arms 16 can be positioned to extend along the back surface 72 of the display, away from the mounting holes 78 and past an end of the guide arms 14 to appropriately position an attachment feature 30, such as the threaded lug shown in the drawings, beyond a respective edge 74 or 76 (depending on the mounting location of audio component 90). As shown in FIGS. 6 and 7, in some instances an overlap area 32 of extension arms 16 and guide arms 14 can be almost equal to the length of the guide arms 14 themselves and can be such that extension arm 16 spans two mounting holes 78. In other instances, such as when using mounting system 10 with a relatively larger display 70, as shown in FIG. 8, the overlap area 32 can be relatively smaller and can span only a single mounting hole 78. Extension arms 16 are shown with each including at least one slot 36 and, in the examples shown, two collinear slots 36 that both extend in the longitudinal direction along extension arms 16. The slots 16 are configured with a length to extend over a plurality of holes 22 of the corresponding guide arms 14 and a width substantially equal to the diameter of holes 22. In other examples, extension arms 16 can include a plurality of holes spaced at the same intervals as those of guide arms 14 so as to align therewith in a number of relative positions therebetween.

Extension arms 16 and guide arms 14 can be simultaneously attached to display 70 by fixation elements, such as screws 34 that are selected to fit within mounting holes 78 of display 70, which can be threaded so as to receive screws 34. In the example shown in the drawings, where display 70 includes four mounting holes 78, two screws 34 can be used to affix each arm 12 to display 70. In such an arrangement, both screws 34 can pass through a slot 36 of one of the extension arms 16 and through a corresponding and aligned one of the holes 22 in the guide arm 14 over which extension arm 16 is positioned before threadably engaging with a corresponding one of the mounting holes 78. In the example of FIG. 8, one screw 34a can pass through slot 36 in extension arm 16 and through an aligned hole 22 in guide arm 14 to engage with a corresponding mounting hole 78. The other screw 34b can pass through another one of the holes 22 without first passing through a slot 16, as no slot 36 is aligned with the hole 22 that corresponds to the remaining mounting hole 78. Screw 34b can then threadably engage with hole 78. In this arrangement, guide arm 14, which is securely held in place by two screws 34a and 34b is prevented from rotating. Because extension arm 16 may be configured to fit around extension arm 14, it is prevented from rotating by guide arm 14, even though only one screw 34a is engaged with extension arm 16. A washer 42 can be used, if necessary to compensate for screw 34b passing through less material by not engaging with extension arm 16.

Slots 36 can allow for adjustment of the position of attachment features 30 and, accordingly, the adjacent ends of extension arms 14 relative to a respective display edge 74 or 76 after assembly of screws 34, as discussed above, but before they are fully tightened into position. In this manner, the screws 34 retain guide arms 14 in place by nature of the screws 34 passing through holes 22 and engaging with mounting holes 78. Extension arms 16 are free to travel along the longitudinal axes thereof while screws are not fully tightened. During such travel, the screws 34 maintain extension arms 16 over the corresponding guide arms 14. Screws 34 can be left in such a partially tightened or partially assembled state while attachment features 30 are aligned with each other and/or are appropriately positioned away from a respective display edge 74 or 76 to properly position the audio component 90, as will be described below.

To assist in the positioning of attachment features 30 and to provisionally maintain a selected position thereof during subsequent assembly of further components, both guide arms 14 and extension arms 16 can include mutually-engaging retention features. In the example shown in FIGS. 6-8, guide arms 14 can include a plurality of projections 38 and extension arms 16 can include a plurality of holes 40 (or in another example detents or the like) that align with the projections 38 such that a plurality of holes 40 engage with a plurality of projections 38 at regular intervals through the permitted travel of extension arms 16 over guide arms 14. In this arrangement, a user can determine a level of tightness for screws 34 such that when holes 40 align with projections 38 they will mutually engage so as to generally maintain a position of extension arm 16 relative to guide arm 14 but to permit movement thereof when a desired level of force is applied to extension arm 16. This can allow for adjustments to the configuration of system 10 during various assembly steps, as needed by the user, with such configurations being maintained while being evaluated to determine if further adjustments are needed.

Once an appropriate configuration is achieved, screws 34 can be fully tightened to secure extension arm 16 in the selected position. When screws 34 are tightened, the alignment and engagement of projections 38 and holes 40 can prevent extension arm 16 from sliding, for example under the weight of audio component 90. In another example, guide arm can include a threaded hole therethrough, such as in a position adjacent slot 16 or within one of side faces 28 thereof. A set screw can be tightened against a corresponding surface of guide arm 14, which in an example can include blind holes or detents with which the set screw can engage to provide alignment intervals for provisional positioning of extension arm 16 on guide arm 14. In other examples, such retention assistance structures can include various spring-loaded and/or pushbutton activated devices that can in some instances use friction to selectively maintain a provisional position of the extension arms 16 relative to the guide arms 14. Alternatively, such structures can include a ratchet-type mechanism or the like.

Figure 5B:
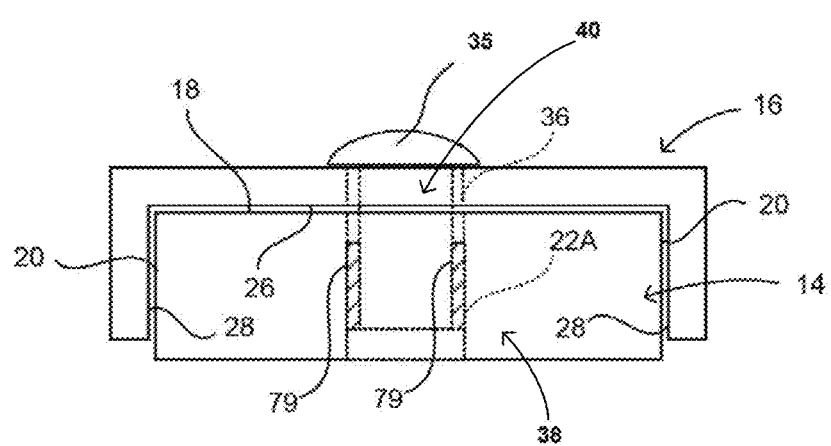
FIG. 5B shows another embodiment of components of the mounting system assembled together.

In one embodiment, referring to FIG. 5B, the guide arm 14 may include a locking element 79, such as molly type fastener or the like, at one or more apertures 22A that maintains or locks a retention element 35, such as screw, within the aperture 22A, when the screw 35 is inserted into and through the aperture 22A. When the screw 35 extends through a slot 36 and then through the aperture 22A so as to be locked within the aperture 22A by the locking element 79, the guide arm 14 may be engaged with the exterior arm 16 at the aperture 22A without the screw 35 being attached to the display 70. The embodiment shown in FIG. 5B is advantageous, for example, when a display includes only a single mounting hole, such that the guide arm, by itself, may be attached to the display at the single mounting hole and the extension arm may be engaged with the guide arm at respective apertures thereof without a screw, which extends through the respective apertures of the guide arm and extension arm, being attached to the display.

Mounting system 10, as shown in FIG. 1, can further include a bridge member 44 configured to attach between extension arms 16 at the attachment features 30 thereof. As such, bridge member 44 can extend alongside an edge 74 or 76 of display 70. Audio component 90 can then be attached with bridge member 44 in a position alongside that same edge 74 or 76 to achieve attachment of audio component 90 to display 70. Bridge member 44 can be configured to receive one or more structures that can facilitate the mounting of audio component 90 thereto. These structures can be configured to attach with different types of attachment or mounting features that can be included on various audio components.

Figure 10A:
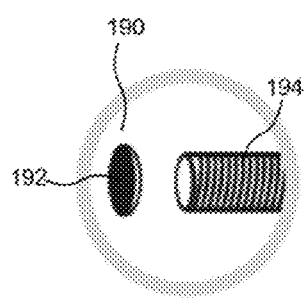
FIGS. 10A and 10B show another example of a mounting structure that can be included in an example of an audio component.
Figure 10B:
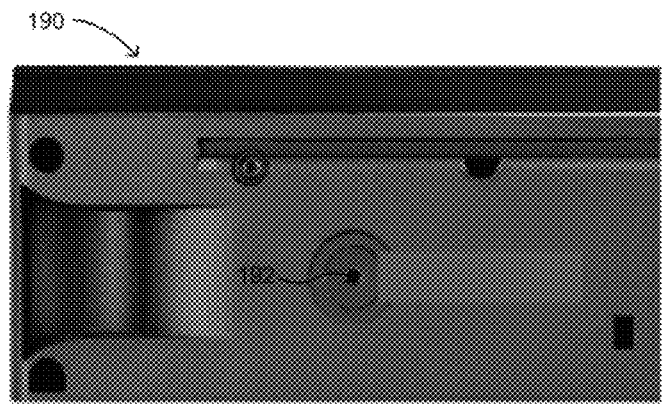
Figure 11A:
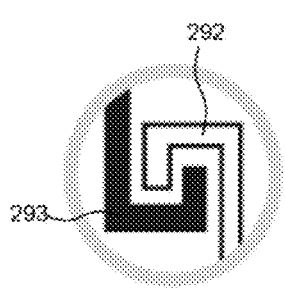
FIGS. 11A and 11B show another example of a mounting structure that can be included in an example of an audio component.
Figure 11B:
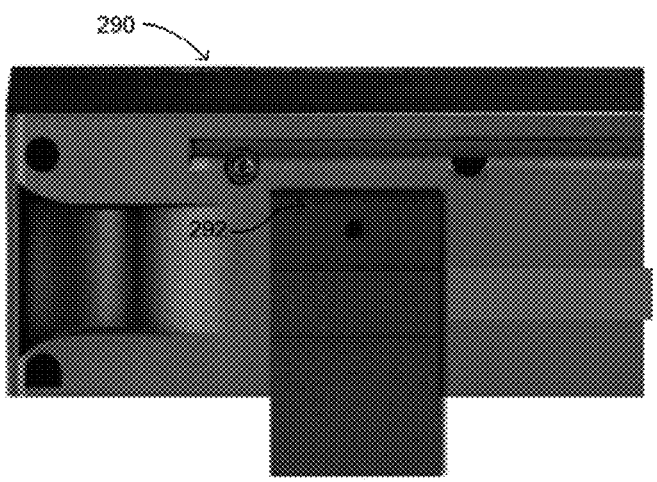

As shown in FIGS. 9A and 9B through 11A and 11B, examples of audio components 90, 190, and 290 can include different mounting elements thereon. FIGS. 9A and 9B show an example of a keyhole 92 with a circular opening 92b configured to receive the head of a bolt 94 therethrough and a slot 92a that is in communication with the opening 92b and is sized to receive the shank portion of bolt 94 therein such that the bolt 94 can be slid up into the slot 92a such that bolt 94 is retained therein. FIGS. 10A and 10B show a threaded hole 192 within a rear face of the audio component 190 that can be used in mounting of audio component 190 by threadable engagement with a bolt 194. Further, FIGS. 11A and 11B show a configuration for an audio component 290 that includes a bracket anchor 292 thereon that can be structured to receive a separate mounting bracket that can be provided by the manufacturer of audio component 292. The exact structure of the anchor 292 and the corresponding mounting bracket (not shown) can vary by the manufacturer. As will be described below, mounting system 10 can include components to allow the different audio components 90, 190, and 290, among others to be attached to bridge member 44. It is noted that, although multiple examples of audio components 90, 190, and 290 are given above, as distinguished by their different mounting elements, a reference to an audio component 90 independent of a mounting type can refer collectively to all examples thereof.

Figure 12:
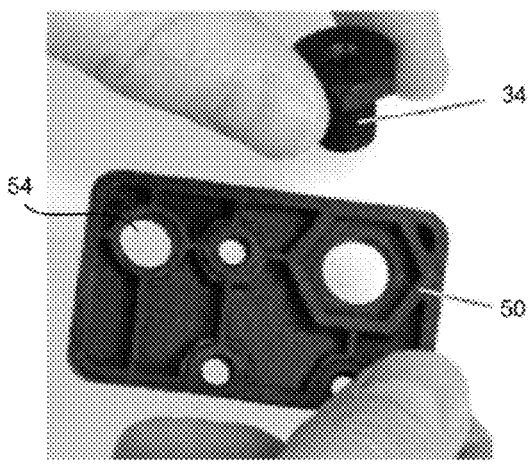
FIG. 12 shows another component that can be included in the mounting system of FIG. 1.
Figure 13A:
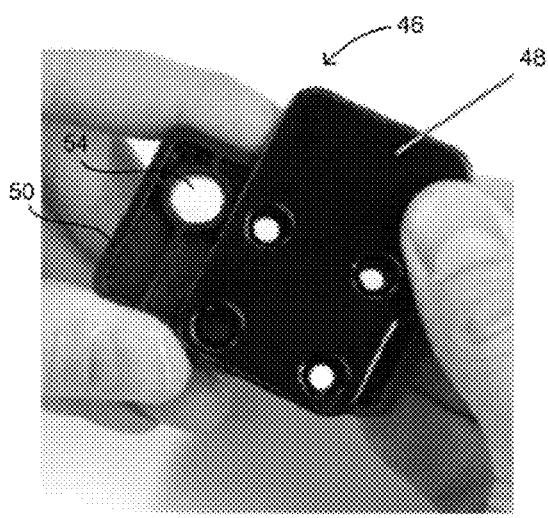
FIGS. 13A and 13B show various configurations of a subassembly that can be included in the mounting system of FIG. 1.
Figure 13B:
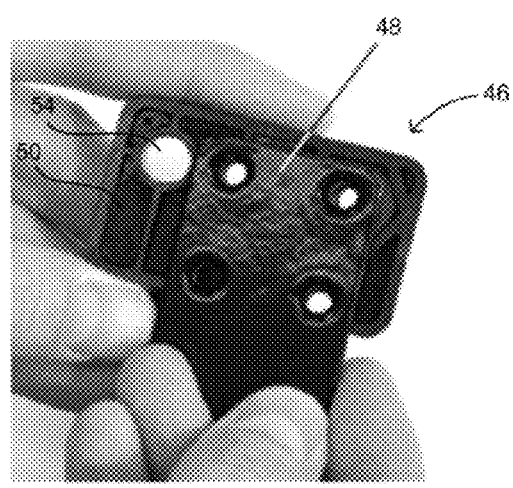
Figure 14A:
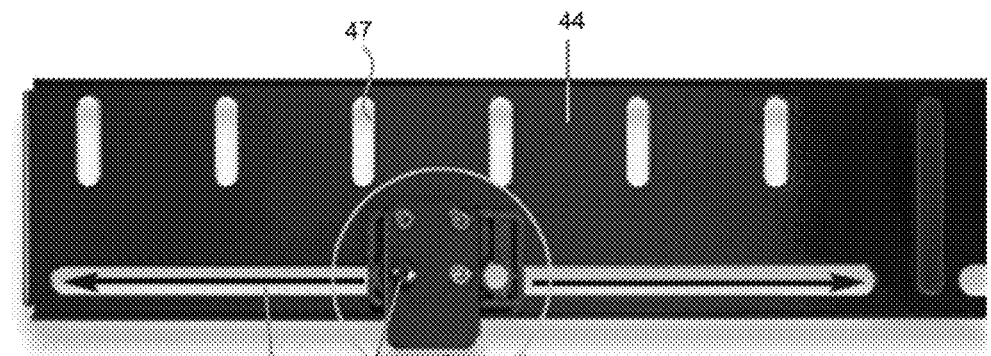
FIGS. 14A and 14B show front and back views of the subassembly of FIGS. 13A and 13B assembled with an additional mounting system component.
Figure 14B:
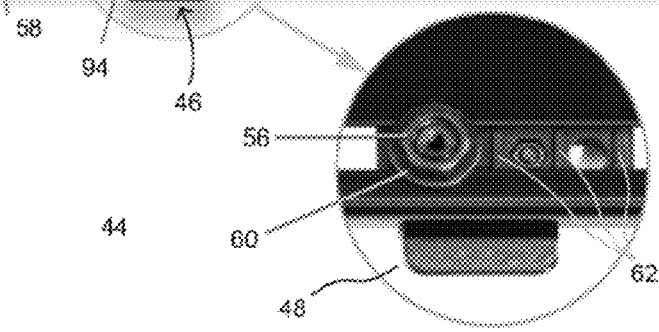
Figure 15:
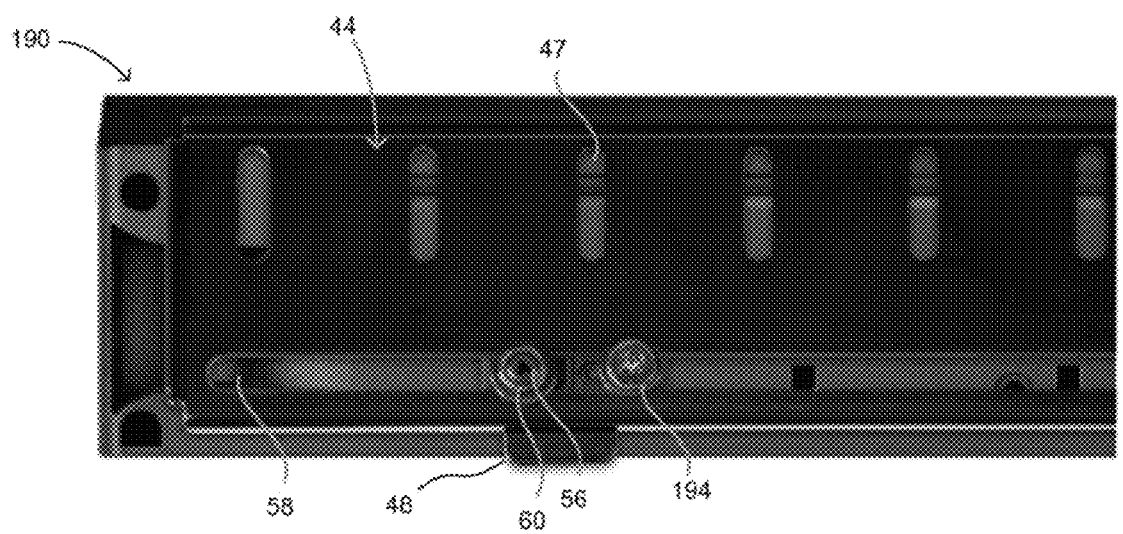
FIG. 15 shows another configuration of the subassembly of FIGS. 13A and 13B with the additional mounting system component of FIGS. 14A and 14B.

FIGS. 12, 13A, and 13B show a support assembly 46 that can be used, for example, with either the keyhole arrangement of FIG. 9A or the threaded hole arrangement of FIG. 10A. The assembly 46 includes a support plate 48 and a support bracket 50 that can be assembled together in either the configuration of FIG. 13A (when audio component 90 is to be mounted adjacent upper edge 76) or FIG. 13B (when audio component 90 is to be mounted adjacent lower edge 74). Support plate can then be affixed to bracket 50 using a plurality of screws or other fixation elements. The resulting support assembly 46 (regardless of the particular configuration selected) is adapted to provide attachment with either a keyhole 92 mounting element or a threaded hole 192 mounting element by providing both a threaded hole 52 and a through hole 54. As shown, threaded hole can be defined on an interior of a boss 56 that provides additional material thickness, which allows an adequate thread distance for a bolt to securely engage. FIGS. 14A and 14B show a support assembly 46 configured for mounting adjacent lower edge 74 and having a bolt 94 assembled with threaded hole 52 so that a keyhole 92 can be assembled thereon to secure audio component 90 to bridge member 44. FIG. 15 shows a support assembly 46 also configured for mounting adjacent lower edge 74 and having a bolt 194 in through hole 54 and engaged with a threaded hole 192 of audio component 190. In an example, two support assemblies 46 can be assembled with mounting elements on audio component 90 or 190 on opposite ends thereof to provide balanced support thereof. Accordingly, each of the two support assemblies 46 can attach with bridge member 44 on opposite ends thereof.

As shown in FIGS. 14A and 14B as well as in FIG. 15, support bracket 50 can be configured to attach with bridge member 44 at a slot 58 therein. Such a configuration can provide a range of positions for support bracket 50 to attach to bridge member 44, as the mounting elements of various audio components 90 can vary widely in position. Accordingly, support bracket, and therefore support assembly 46, can be slid within slot 58 to the appropriate position to allow two such support assemblies 46 to engage with two mounting elements (such as keyholes 92 or threaded holes 192) on opposite ends thereof. As shown in FIG. 1, bridge member 44 can include two collinear slots 58 on opposite sides thereof. Boss 56 is configured to fit through slot 58 and has a threaded exterior so that a nut 60 can be threaded onto boss to attach boss over the surface of bridge member 44 adjacent slot 58 to secure support assembly 46 thereto. This attachment configuration can be used with any of the above-described mounting element configurations of assembly 46. Further, as shown in FIG. 14B, support bracket 50 can include one or more flanges 62 that fit within slot 58 to help maintain a rotational position of assembly 46 relative to bridge member 44. In the arrangement shown in FIG. 15 wherein bolt 194 passes through the corresponding through hole 192 before engaging with threaded hole 192 in audio component 190, bolt 194 can also contact the surface of bridge member 44 adjacent slot 58 to provide further securing of assembly 46 to bridge member 44 and can further prevent rotation thereof.

Figure 16:
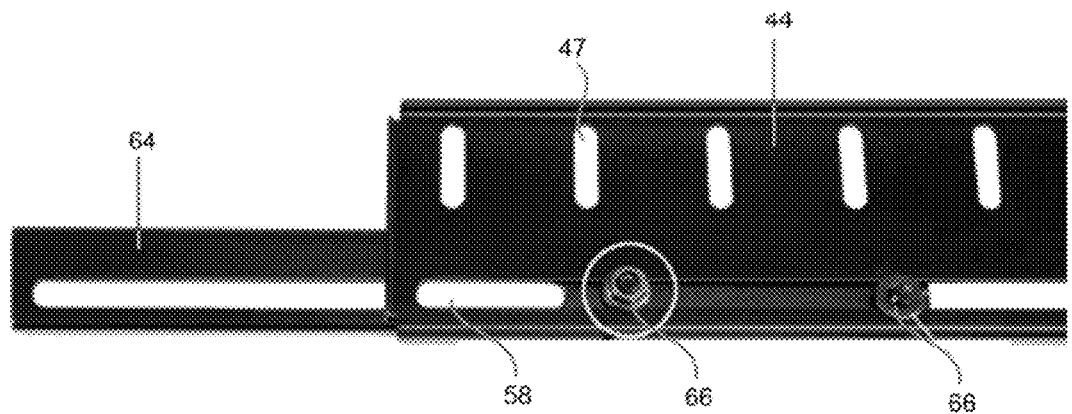
FIG. 16 shows an optional configuration of mounting system components that include optional components thereof.

In instances where the mounting elements of an audio component 90 are spaced at a distance from each other that is wider than bridge member 44, side extensions 64 can be affixed to slots 58 as shown in FIG. 16. The side extensions 64 can be positioned so as to extend beyond the lateral ends of bridge member 44 at a desired distance by appropriately positioning them along their respective slots 58. Side arms 64 can be affixed by a plurality of fixation elements 66 that pass therethrough and through bridge member slots 58. Side arms can be configured such that fixation elements (such as the nut, bolt, and washer combination shown in FIG. 16) are spaced apart at an appropriate distance to provide adequate support for the load that is to be applied thereto without rotation or sagging. Side arms 64 include their own respective slots 68 to which support assembly 46 can adjustably attach in an appropriate position to secure audio component 90 thereto.

Figure 17:
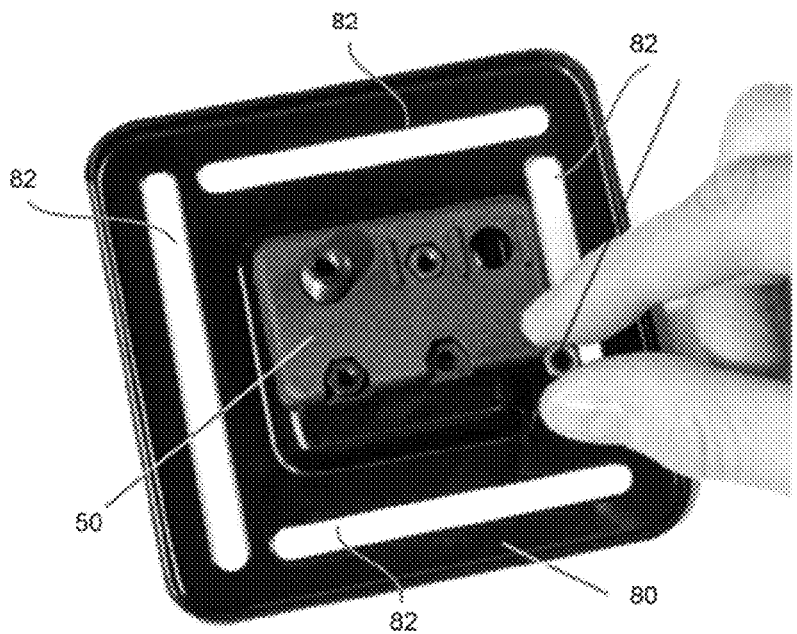
FIG. 17 shows an additional subassembly that can be used in the mounting system of FIG. 1.
Figure 18:
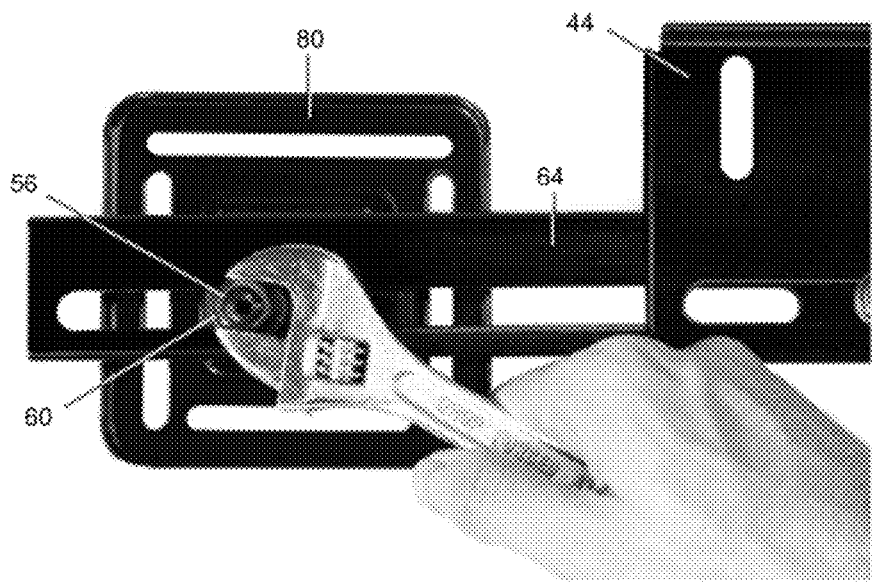
FIG. 18 shows an example configuration of components in the mounting system.
Figure 19:
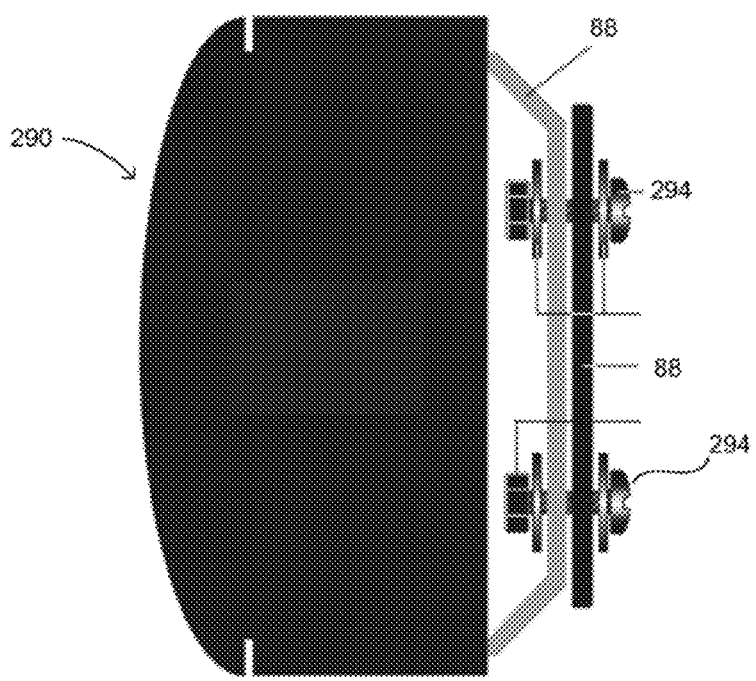
FIG. 19 shows a side view of the example configuration of FIG. 18 with an example of an audio component assembled therewith.

As shown in FIG. 17, mounting system 10 can include an adapter plate 80 having a slot 82 formed therein such that an audio component 290 with a particular bracket structure 294 can be attached thereto. In the example shown in FIG. 17, adapter plate 80 can have a plurality of slots 82 in a variety of sizes and/or positions such that it can fit with different configurations of brackets that may be provided with such audio components 290. As such, mounting bracket can be affixed with bracket 50 in a number of rotational positions such that the appropriate one of the slots 82 can properly align with a portion of the mounting bracket that can be received therein, as shown in FIGS. 18 and 19.

Figure 20:
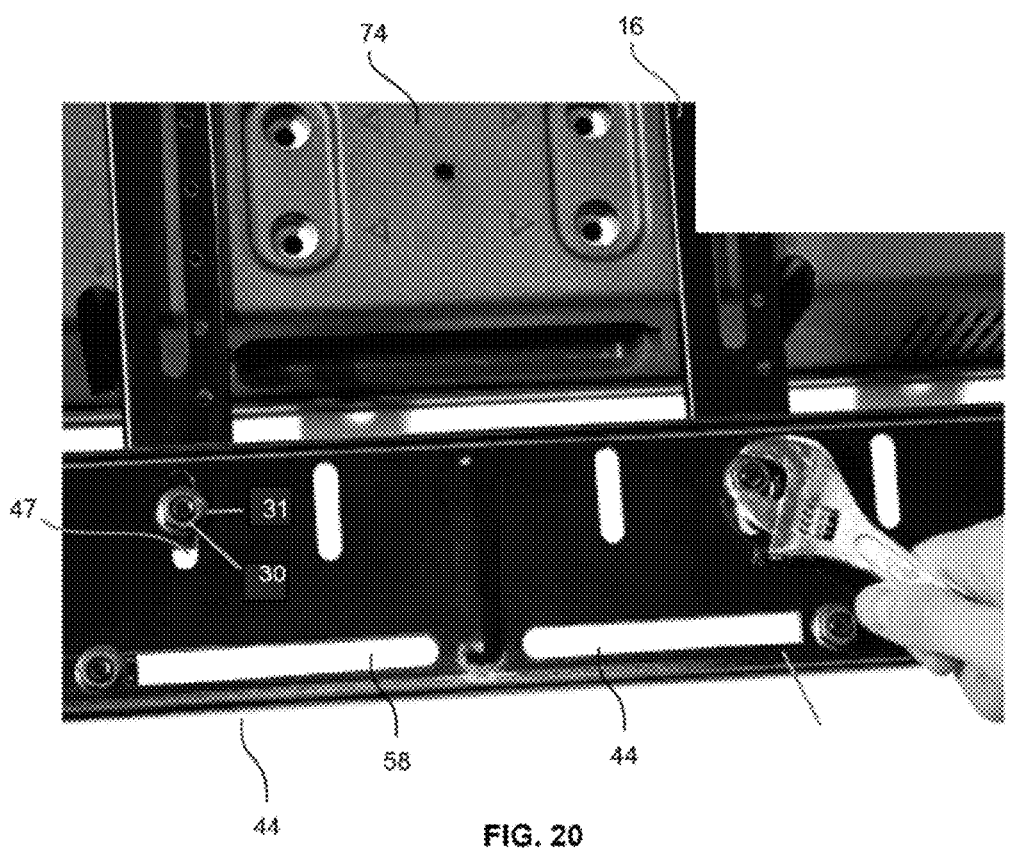
FIG. 20 shows a detail view of assembled components of the mounting system.

Bridge member 44 can include a plurality of vertical slots 47 that can be used to attach bridge member to adjustable arms 12 at the attachment features 30 provided on the ends of the respective extension arms 16, as discussed above. In an example, referring to FIG. 20, attachment features can be threaded lugs that extend from extension arms such that they can be assembled into vertical slots 47 and secured to bridge arms by a plurality of nuts 31 that are threadably engagable therewith so as to capture portions of bridge member adjacent vertical slots 47 between nuts 31 and the corresponding portions of extension arms 16. Vertical slots 47 can be provided in positions such that they can align with arms 12 when attached to display 70 in one of the various positions discussed above. For example, where the holes are positioned in a location corresponding to mounting holes 78 in one of a number of predetermined standardized configurations (such as the VESA mounting standard previously discussed), arms can, for example, be positioned in intervals of 70, 100, or 200 mm apart, and a plurality of vertical slots 47 can be positioned in bridge member 44 accordingly. Further, even more additional vertical slots 47 can be included to allow the user to optionally position bridge member off-center, if desired. Vertical slots 47 can permit adjustment of the position of bridge member with respect to the corresponding edge 74 or 76 of display 70, as needed to accommodate various sizes of audio components 90 or to allow desired positioning thereof toward and away from the corresponding edge 74 or 76 as desired by the user. In an alternative embodiment, the slots used to attach bridge member 44 to arms 12 can be parallel with slots 58. Still further, a plurality of holes can be substituted for slots 47 in a spacing configuration similar to that which is described above for vertical slots 47.

The mounting system 10 described above can be assembled by a user in a similar progression to which the components and their structures were discussed above. In a method according to another aspect of the present disclosure, a user can assemble mounting system 10 in a manner such that an audio component 90 and a display 70, as shown in FIG. 1, are attached together. The user can begin either with assembly of guide arms 14 to the back surface of display 70 at mounting holes 78 thereof, as discussed above and in an appropriate configuration for mounting audio component 90 either adjacent upper edge 76 or lower edge 74. In a variation of the method, the user can begin by determining the configuration of support assembly 46 needed to attach with the particular audio component 90, 190, or 290 to be mounted, as discussed above. If beginning with the assembly of guide arms 14, the user can continue to attach extension arms 16 to guide arms using screws 34 as discussed above with the attachment features 30 thereof positioned beyond and adjacent the desired edge 74 or 76, which can include assembly of both screws 34 through a corresponding slot 36. The extension arms can be provisionally positioned in an adjustable manner by appropriate partial tightening of screws 34, as discussed above.

Either after assembly of arms 12 with display 70 or before such assembly, the user can assemble either mounting plate 48 or adapter plate 80 with bracket 50 in the appropriate orientation, as discussed above. The user can then determine if side arms 64 are needed. If not, then the resulting support assembly 46 can be adjustably attached with the slot 58 of bridge member 44 by partial tightening of nuts 60. Support assemblies 46 can then be slid within slots 58 for appropriate alignment with the mounting elements of audio component 90. If side arms 64 are needed, they can be assembled with bridge member 44 by attachment of fixation elements 66 with slots 58 thereof. Support assemblies 46 can then be attached within side arm slots 68 in a similar manner as described with bridge member 44 slots 58.

Regardless of how the user begins the assembly of mounting structure 10, once the support assemblies 46 are appropriately assembled with bridge member 44 and arms 12 are affixed with display 70, bridge member 44 can be assembled with arms 12, as discussed above. This can include further adjustment of extension arms 16 on guide arms 14 and full tightening of screws 34 once appropriate positioning thereof is achieved. Additionally, as discussed above, bridge member can be attached with the attachment features 30 of extension arms, including by selection of appropriate vertical slots for assembly with attachment features 30. This can further include adjustment of the positioning of bridge member 44 relative to the corresponding edge 74 or 76 by positioning of attachment feature 30 within vertical slots 47.

Audio component 90 (or 190 or 290) can then be mounted to bridge member by attachment of the mounting element thereof with the appropriately-configured support assembly, as also described above. At such a point, mounting system 10 is fully assembled and is attached with both display 70 and audio component 90. The resulting assembly can then be mounted to a wall using a separate bracket or other structure or appropriately positioned on a surface.

In the examples discussed above, relative positions such as lateral, longitudinal, horizontal, vertical, and the like are used for reference only and are not intended to be limiting with respect to particular positions of the elements they are used to describe.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A mounting system for attachment between a first external component and a second external component, comprising:
    an interior arm extending along a longitudinal axis and having a plurality of first apertures therethrough at spaced apart intervals and being aligned with one another in a single row along the longitudinal axis, the interior arm having first and second spaced apart and substantially parallel faces, to which the first apertures are open, and first and second side walls extending between the faces;
    an exterior arm extending along a longitudinal axis and configured to be coupled with the interior arm, the exterior arm further including a second aperture configured to align with at least one first aperture of the interior arm when the interior arm is arranged for coupling with the exterior arm, the exterior arm including a first mounting means disposed toward a first end thereof and configured to facilitate attachment between the exterior arm and the second external component; and
    first and second fixation elements, first fixation element configured to extend through one of the first apertures in the interior arm and engage with the first external component, and the second fixation element configured to extend through the second aperture of the exterior arm and through another of the first apertures in the interior arm when the interior arm is arranged for coupling with the exterior arm so as to at least partially maintain a position of the exterior arm relative to the first external component,
    wherein the first external component defines a face extending in first and second lateral directions to edges surrounding the face, and wherein the first and second fixation elements are configured to engage with threaded apertures positioned at predetermined intervals along the face remote from the edges such that the interior arm extends along the face, and wherein the first mounting means is positionable laterally beyond one of the edges from the face by adjustment of the exterior arm relative to the longitudinal axis of the interior arm such that the second external component does not overlie the face.

2. The mounting system of claim 1 further comprising:
a locking element at the another of the first apertures of the interior arm for engaging with the second fixation element.

3. The mounting system of claim 2, wherein the exterior arm defines a channel configured to receive at least a portion of the interior arm therein with portions of the channel contacting the side walls and the first face of the interior arm, and wherein the second fixation element is configured to engage with the interior arm with the interior arm received within the channel of the exterior arm.

4. The mounting system of claim 1, wherein the second fixation element is configured to extend through the second aperture of the exterior arm and through the another of the first apertures in the interior arm and to attach with the first external component when the interior arm is arranged for coupling with the exterior arm.

5. The mounting system of claim 4, wherein the exterior arm defines a channel configured to receive at least a portion of the interior arm therein with portions of the channel contacting the side walls and the first face of the interior arm, and wherein the second fixation element is configured to attach with the first external component with the interior arm received within the channel of the exterior arm.

6. The mounting system of claim 5, wherein the interior arm is slidably affixed within the channel of the exterior arm.

7. The mounting system of claim 5, wherein the second aperture of the exterior arm is an elongated slot extending in the direction of the longitudinal axis thereof, the slot configured to align with a plurality of the first apertures of the interior arm when the interior arm is received within the channel, and wherein the second fixation element is configured to extend through the slot of the exterior arm and through the other of the first apertures in the interior arm and to attach with the first external component with the interior arm received within the channel of the exterior arm.

8. The mounting system of claim 1, wherein the interior arm includes a plurality of first retention assistance members, and the exterior arm includes a plurality of second retention assistance members, the first and second retention assistance members being spaced apart relative to one another at regular intervals in directions along the respective longitudinal axes of the interior arm and the exterior arm such that at least some of the first retention assistance members align with at least some of the second retention assistance members when the interior arm is coupled with the exterior arm in a plurality of fixed intervals along the longitudinal axes.

9. The mounting system of claim 8, wherein the first retention assistance members are generally convex projections that extend from the first face of the interior arm, and wherein the second retention assistance members are apertures open to a channel of the exterior arm, the channel configured to receive at least a portion of the interior arm therein with portions of the channel contacting the side walls and the first face of the interior arm.

10. The mounting system of claim 8, wherein the first and second retention assistance members are configured to maintain a position of the exterior arm relative to the second exterior arm when at least the second fixation element is received through the second aperture and one of the first apertures and engaged with the first external component.

11. The mounting system of claim 1, further including secondary locking means engagable between the exterior arm and the interior arm to help maintain a position of the exterior arm along the longitudinal axis of the interior arm when the interior arm is coupled with the exterior arm.

12. A mounting system for attachment between a first external component and a second external component, comprising:
    a first extension arm configured to attach with the first external component at a first lateral position therealong, the first extension arm having a first attachment element on an end thereof;
    a second extension arm configured to attach with the first external component at a second lateral position therealong that is spaced apart from the first lateral position at a first distance, the second extension arm having a second attachment element on an end thereof; and a bridge member having a lateral axis and a longitudinal axis, the bridge member including first and second attachment apertures;

wherein the bridge member is affixable to the first extension arm by receiving the first attachment element in the first attachment aperture and to the second extension arm by receiving the second attachment element in the second attachment aperture, the bridge member further including a mounting aperture configured for attachment with the second external component, wherein the first and second apertures include a first one and a second one of a plurality of first slots spaced apart from one another in the direction of the lateral axis, wherein the first one and the second one of the slots are elongated in a direction parallel to the lateral axis of the bridge member, wherein the bridge member is affixable to the first extension arm by receiving the first attachment element in the first one of the first slots and to the second extension arm by receiving the second attachment element in the second one of the first slots, and wherein the first and second attachment elements are slidable within their respective first slots in the direction of the lateral axis of the bridge member.

13. The mounting system of claim 12, wherein the first and second apertures include a third one and a fourth one of the plurality of first slots evenly spaced apart from one another at a first interval in the direction of the lateral axis, each of the third one and fourth one of the first slots extending parallel to the lateral axis of the bridge member, wherein the bridge member is affixable to the first extension arm by receiving the first attachment element in the third first one of the first slots and to the second extension arm by receiving the second attachment element in the fourth one of the first slots.

14. The mounting system of claim 13, wherein the first one, the second one, the third one and the fourth one of the slots are selectable from the plurality of slots including being spaced apart from each other at a distance that corresponds to the lateral distance between the first and second extension arms.

15. The mounting system of claim 13, wherein each of the third one and the fourth one of the first slots is elongated in a direction parallel to the longitudinal axis of the bridge member, and wherein the first and second attachment elements are slidable within respective ones of the third one and the fourth one of the first slots in the direction of the longitudinal axis of the bridge member.

16. The mounting system of claim 12, wherein the mounting aperture of the bridge member is a slot extending in the direction of the lateral axis.

17. The mounting system of claim 12, further including an adaptor plate and a plurality of adaptors, the adaptors each having a distinct mounting configuration such that one of the adaptors is selectable to match a mounting configuration of the second external component, the adaptor plate being configured to attach the selected one of the adaptors to the bridge member for attachment of the second external component thereto.

18. The mounting system of claim 12, further including a side arm affixable with the bridge member so as to extend outwardly therefrom in the direction of the lateral axis thereof, the mounting aperture being positionable on the side arm.

\* \* \* \* \*